United States Patent
Wu et al.

(10) Patent No.: US 9,316,835 B2
(45) Date of Patent: Apr. 19, 2016

(54) HEAD WORN DISPLAY DEVICE

(71) Applicant: Lenovo (Beijing) Co., Ltd., Haidian District, Beijing (CN)

(72) Inventors: Fei Wu, Beijing (CN); Junfeng Liu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 207 days.

(21) Appl. No.: 13/945,334

(22) Filed: Jul. 18, 2013

(65) Prior Publication Data

US 2014/0028704 A1 Jan. 30, 2014

(30) Foreign Application Priority Data

Jul. 30, 2012 (CN) .......................... 2012 1 0266856

(51) Int. Cl.
*G02B 27/01* (2006.01)
(52) U.S. Cl.
CPC .......... *G02B 27/0176* (2013.01); *G02B 27/017* (2013.01); *G02B 2027/0138* (2013.01)
(58) Field of Classification Search
CPC ..................... G06T 19/006; G06T 2207/30244
USPC .......................................................... 345/619
See application file for complete search history.

(56) References Cited

U.S. PATENT DOCUMENTS

| | | | | |
|---|---|---|---|---|
| 3,563,146 | A * | 2/1971 | Miller ............................... | 396/21 |
| 2003/0227542 | A1 * | 12/2003 | Zhang et al. .................... | 348/61 |
| 2005/0168569 | A1 | 8/2005 | Igarashi et al. | |
| 2006/0056677 | A1 * | 3/2006 | Tani .............................. | 382/153 |
| 2008/0266386 | A1 | 10/2008 | Maeda | |
| 2010/0214445 | A1 * | 8/2010 | Chronqvist ............. | 348/231.99 |
| 2010/0259619 | A1 * | 10/2010 | Nicholson ..................... | 348/158 |
| 2011/0273365 | A1 | 11/2011 | West et al. | |

(Continued)

FOREIGN PATENT DOCUMENTS

| | | |
|---|---|---|
| CN | 101141567 A | 3/2008 |
| CN | 101295206 A | 10/2008 |

(Continued)

OTHER PUBLICATIONS

Chinese First Office Action with English Translation for related Application No. 201210266856.4 dated Mar. 25, 2015, 10 pages.

(Continued)

*Primary Examiner* — Joni Richer
*Assistant Examiner* — Yanna Wu
(74) *Attorney, Agent, or Firm* — Brinks Gilson & Lione; G. Peter Nichols (57) ABSTRACT

A display device is described and includes a fixing unit, through which the display device is capable of being worn on a head of a user; a processing unit configured to obtain a first image to be displayed; an image transmission unit configured to transmit the first image to a display unit, which is configured to display the first image obtained by the processing unit; a connection unit configured to connect the fixing unit and at least a first portion of the display unit, wherein the connection unit at least has a first state, in which at least the first portion is located in the user's visual region and faces the user; an image capturing unit configured to capture a second image; and the processing unit being further configured to generate the first image based on the second image.

6 Claims, 4 Drawing Sheets

(56) References Cited

U.S. PATENT DOCUMENTS

2012/0134543 A1* 5/2012 Fedorovskaya et al. ...... 382/107
2012/0182215 A1* 7/2012 Han ...................... G06F 3/017
　　　　　　　　　　　　　　　　　　　　　　345/156

FOREIGN PATENT DOCUMENTS

CN　　102326383　　1/2012
TW　　M251411 U　11/2004

OTHER PUBLICATIONS

Second Office Action dated Oct. 9, 2015 out of corresponding Chinese priority Application No. 201210266856.4 (19 pages including English translation).

Third Office Action dated Feb. 22, 2016 out of corresponding Chinese priority Application No. 201210266856.4 (18 pages including English translation).

* cited by examiner

HEAD WORN DISPLAY DEVICE

This application claims priority to Chinese patent application No. 201210266856.4 filed on Jul. 30, 2012, the entire contents of which are incorporated herein by reference.

The present invention relates to a display device, more particularly, relates to a display device that can be worn on a head.

BACKGROUND

In order to reduce a space occupation while giving a user a better viewing experience, and to prevent what the user is viewing from being peeped by others, a head-worn display device was proposed in recent years. Most of the existing head-worn display devices comprise two sub-display units corresponding to two eyes of the user. In general, the display device is formed in a structure similar to that of glasses. Specifically, a sub-display unit, a processing unit (e.g., a processing unit) and other components in a display device are integrated into a main body of the head-worn display device, and the main body can be supported on the user's nose, and can be supported on the user's right and left ears with two support arms separately connecting to the main body, so that the user can wear the display device as if he/she is wearing glasses.

However, as the display screen of the existing head-worn display device is always located in a visual region in front of the user's eyes, when the user wants to see the surroundings instead of the displayed content, he usually has to take off the head-worn display device in order to see clearly.

On the other hand, most of the existing acquisition devices are handheld devices. When the user is capturing videos and/or audios etc., he often needs to hold the capture device with his hands, which is not convenient for a long time capturing.

SUMMARY

The embodiments of the present invention aim to provide a display device to solve the above problem.

One embodiment of the present invention provides a display device, comprising: a fixing unit, through which the display device can be worn on a head of a user; a processing unit configured to obtain a first image to be displayed; an image transmission unit configured to transmit the first image to a display unit; a display unit configured to display the first image obtained by the processing unit; a connection unit configured to connect the fixing unit and at least a first portion of the display unit, wherein the connection unit at least has a first state, under which at least the first portion is located in the user's visual region and faces the user; and an image capturing unit configured to capture a second image; the processing unit being further configured to generate the first image based on the second image.

In the display device according to the embodiments of the present invention, the image capturing unit can acquire images, videos and/or audios etc of the surroundings, and the display device can generate the first image based on the images captured by the image capturing unit, and display the first image to the user. Thus, when the user wearing the display device wants to watch the surroundings, he does not have to take off the display device from his head.

Moreover, the display device according to the embodiments of the present invention comprises the image capturing unit, so that when the display device is worn on the user's head, the image capturing unit can rotate in synchronization with the user's head and thus free the user's hands, which facilitates the user's operation for it does not require the user to hold the electronic device with hands while capturing videos and images etc.

BRIEF DESCRIPTION OF THE DRAWINGS

In order to illustrate clearly technical solutions according to the embodiments of the present invention, drawings used for description of the embodiments of the present invention will be briefly described as follows.

DETAILED DESCRIPTION

Hereinafter, preferred embodiments of the present invention will be described in detail with reference to the accompanying drawings. It should be noted that in this specification and the drawings, steps and elements that are substantively the same will be indicated by the same reference signs, and repeated explanation for these steps and elements will be omitted.

Figure 1:
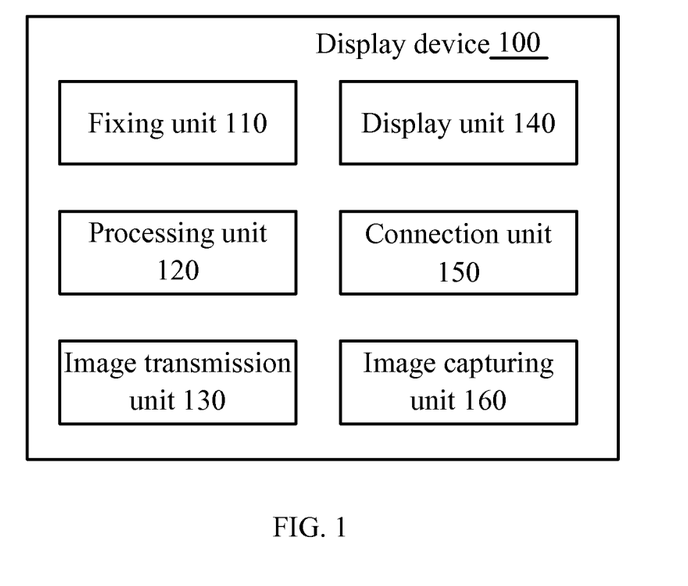
FIG. 1 shows an exemplary block diagram of a display device according to one embodiment of the present invention.

Next, an electronic device in one embodiment of the present invention is illustrated by referring to FIG. 1. FIG. 1 shows an exemplary block diagram of a display device 100 according to one embodiment of the present invention. As shown in FIG. 1, the display device 100 comprises a fixing unit 110, a processing unit 120, an image transmission unit 130, a display unit 140, a connection unit 150 and an image capturing unit 160.

The display device 100 can be worn on a head through the fixing unit 110. For example, the fixing unit 110 may include, for example, helmets, headbands and other wearing parts. The processing unit 120 can obtain a first image to be displayed. For example, the first image may be a picture, a video image, a text, or a combination thereof. The processing unit 120 can generate the first image to be displayed based on the stored images, video files etc. For example, files such as images and videos can be stored in a memory of the processing unit, and furthermore, a storage unit can also be separately set in the display device to store these files. Alternatively, the processing unit 120 may also receive the first image to be displayed from electronic devices such as a computer, a smart phone, or a multimedia player that are connected to the display device 100 in a wired or wireless manner. For example, a communication module can be set in the processing unit to receive the first image to be displayed from the electronic devices such as a computer, a smart phone, or a multimedia player. In addition, the display unit may also include a communication unit that is separately set, so as to receive the first image to be displayed from the electronic devices such as a computer, a smart phone, or a multimedia player. The image transmission unit 130 can transmit the first image to the display unit 140, and the display unit 140 can display the first image obtained by the processing unit.

The connection unit 150 can connect the fixing unit 110 and at least a first portion of the display unit 140. The connection 150 at least has a first state. When the connection unit 150 is in the first state, at least the first portion of the display unit 140 is located in the user's visual region and faces the user.

According to one example of the present invention, the connection unit 150 can be always in the first state, i.e., when the display unit 100 is worn on the user's head through the fixing unit 110, at least the first portion of the display unit 140 is located in the user's visual region and faces the user all the time.

Alternatively, according to another example of the present invention, the fixing unit 110 may also have a second state. When the connection unit 150 is in the second state, and when the display unit 100 is worn on the user's head through the fixing unit 110, at least the first portion of the display unit 140 may move away from the user's visual region.

According to another example of the present invention, the connection unit 150 may include a supporter for supporting the display unit 140 in the first state. In this case, the image transmission unit 130 may be transmission lines provided in the supporter. Alternatively, the image transmission unit 130 may also transmit the first image to the display unit 140 in a wireless manner to avoid wiring in the connection means such as a supporter.

The length, width, thickness, shape or weight of the supporter may vary with mechanical movement or magnetostrictive motion in order to implement change and adjustment of the position of the display unit. In the first state, there is a first included angle between the connection unit 150 and a plane corresponding to the fixing unit 110. In this example, the plane corresponding to the fixing unit 110 may be a cross section of the fixing unit 110 along the direction of the user wearing the display device. And in the second state, there is a second included angle between the connection unit 150 and the display unit 140.

In addition, according to one example of the present invention, the connection unit 150 may also include first hinge means and second hinge means. For example, the supporter can be connected to the display unit and/or the fixing unit through connection mechanism such as a slide rail or a hinge to implement change of relative position. The first hinge means can connect the supporter and the fixing unit, so that the supporter can deflect around the first hinge means; and the second hinge means can connect the supporter and the display unit, so that the display unit can deflect around the second hinge means. Alternatively, the connection unit 150 may also include slide rail means for connecting the display unit. When the fixing unit 110 is forwardly worn, supporters can be set separately at the positions close to the user's left and right ears to support the display unit.

Further, according to another example of the present invention, the fixing unit may also include rotating means. For example, in a situation the fixing unit 110 is a helmet, in the first state, the rotating means can be rotated so that the display unit 140 is located in the visual region in front of the user's eyes; and in the second state, the rotating means can be rotated so that the display unit 140 moves up to a interlayer or top of the helmet.

According to one example of the present invention, the display unit 140 may include a display screen of small size. In the first state, the display unit 140 is located in the user's visual region and faces the user. The user can directly watch things through the display screen of the display unit 140. In this case, when the connection unit 150 is in the first state, the entire display unit 140 is located in the user's visual region, and the display screen of the display unit 140 can face the user. In addition, according to another example of the present invention, the display unit 140 may also include a display screen and an optical system. The display screen can display the first image obtained by the processing unit. The optical system can receive light emitted from the display screen, and convert the optical path of the light emitted from the display screen, to form an enlarged virtual image. According to one example of the present invention, the display screen can be a micro-display screen with smaller size. The optical system can receive light emitted from the display screen, and convert the path of the light emitted from the display screen, to form an enlarged virtual image. That is to say, the optical system has a positive refractive power, and the user can view a larger size enlarged virtual image of the first image through the optical system. Thus, the user can clearly see the first image, and the size of the image that the user is viewing is not limited to that of the display unit.

For example, the optical system may include a convex lens. Alternatively, in order to reduce aberration and avoid interference of dispersion etc. on imaging, and to give the user a better visual experience, the optical system may also include a lens assembly consisting of a plurality of convex and concave lens.

According to another example of the present invention, the display screen and the optical system can be set along the optical axis of the optical system correspondingly. In this case, when the connection unit 150 is in the first state, the display screen and the optical system of the display unit 140 are both located in the user's visual region, and face the user.

Further, according to another example of the present invention, the display unit may also include: first light guide means, lens and second light guide means. After the optical system receives light emitted from the display screen, and converts the path of the light emitted from the display screen, the first light guide means can transmit the light to the second light guide means disposed in the lens. The second light guide means can receive the light transmitted by the first light guide means, and, when the connection unit 150 is in the first state, the second light guide means reflects the light to the user. In this case, the first portion of the display unit 140 may include a lens and second light guide means. When the connection unit 150 is in the first state, the lens and the second light guide means of the display unit 140 can be located in the user's visual region and is toward the user.

Alternatively, the lens meets a first predetermined transmissivity in a direction from inside to outside, so that the user can view the surroundings while viewing the enlarged virtual image. On the other hand, the lens meets a second predetermined transmissivity in a direction from outside to inside, so that when the ambient lights are too strong, part of the lights can be refracted or reflected.

According to one example of the present invention, the image capturing unit 160 may be disposed outside the fixing unit 110. In the embodiment of the present invention, the outside of the fixing unit 110 is a side departing from the user's head when the display device is worn on the user's head. Alternatively, according to another example of the present invention, the image capturing unit 160 may also be disposed on the display unit 140 or the connection unit 150. Furthermore, according to another example of the present invention, the image capturing unit 160 may include a plurality of image capturing means.

For example, as described above, the display unit 140 may include a display screen of smaller size, and the user can directly watch things through the display screen of the display unit 140. In this case, the image capturing unit 160 may include two image capturing means, and is disposed in corresponding with the user's eyes on one side of the display unit 140 departing from the user's visual region. And for example, as described above, the display unit 140 may also include first light guide means, lens and second light guide means. In this case, the image capturing unit 160 may include two image capturing means, and is disposed on the upper or lower side of the lens of the display unit 140 in corresponding with the positions of the user's eyes. Thus, the image capturing unit 160 may acquire images on the positions in corresponding with the user's eyes to ensure that the acquired images are similar to the scene that the user actually sees with eyes.

The image capturing unit 160 may be directly disposed on at least one of the fixing unit 110, display unit 140 and connection unit 150. Alternatively, according to another example of the present invention, the display unit 100 may also include a popup unit for connecting the image capturing unit to the fixing unit. The popup unit may have a pop-up state and a pack-up state. When the popup unit is in the pop-up state, the image capturing unit 160 is located outside the fixing unit 110, and the image capturing unit 160 is on and acquiring images; and when the popup unit is in the pack-up state, the image capturing unit is located inside the fixing unit, and the image capturing unit is off.

The image capturing unit 160 can capture a second image. In addition, the processing unit 120 can generate the first image based on the second image captured by the image capturing unit 160, and as stated above, the first image is transmitted by the image transmission unit 130 to the display unit 140.

In addition, according to an example of the present invention, the display device 100 may further include an adjusting unit. The adjusting unit can adjust an capture area of the image capturing unit according to a position of an object to be captured by the image capturing unit 160. For example, the user can adjust the focal length, camera angles, etc of the image capturing means in the image capturing unit 160 according to the position of the object to be captured by the image capturing unit 160. Optionally, the display device 100 may further include a capture object positioning unit. The capture object positioning unit may recognize the images acquired by the image capturing unit 160, to determine an object to be acquired therein (for example, a photographed person or article in the central area of the second image is taken as the object to be acquired), track and determine the position of the object to be acquired. The adjusting unit can automatically adjust the capture area of the image capturing unit according to the position of the capture object that is determined by the capture object positioning unit.

In the display device according to the embodiments of the present invention, the image capturing unit can acquire images, videos and/or audios etc of the surroundings, and the display unit can generate the first image based on the images captured by the image capturing unit, and display the first image to the user. Thus, when the user is wearing the display device and wants to see the surroundings, he does not have to take off the display device from his head.

Moreover, the display device according to the present embodiment includes an image capturing unit, so that when the display device is worn on the user's head, the image capturing unit can rotate in synchronization with the user's head and thus free the user's hands, which facilitates the user's operation for it does not require the user to hold the electronic device with hands while capturing videos and images etc.

Figure 2A:
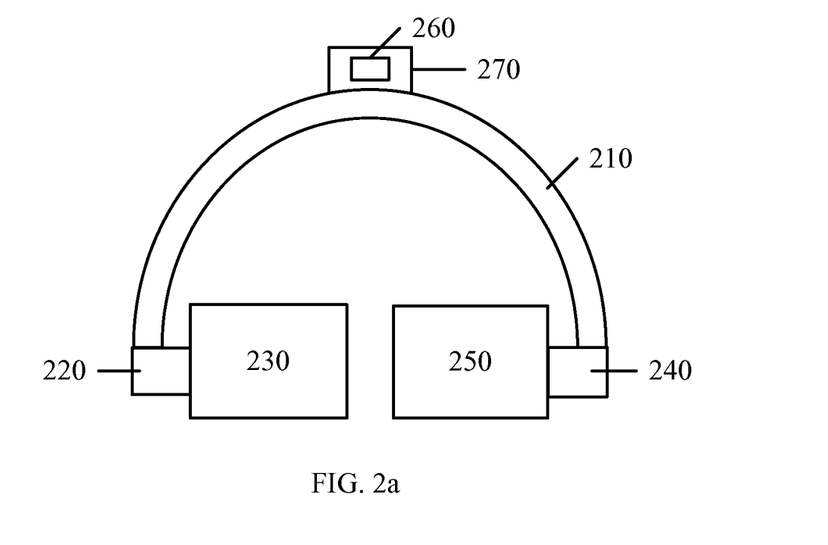
FIG. 2a is a front view showing an exemplary basic structure of the display device shown in FIG. 1.
Figure 2B:
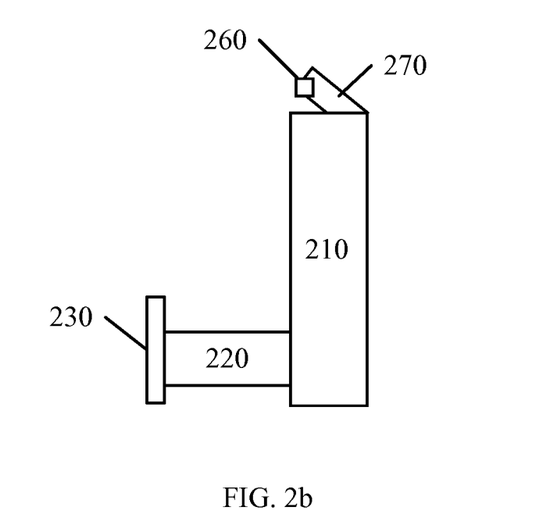
FIG. 2b is a side view showing the exemplary basic structure of the display device shown in FIG. 1.

Next, referring to FIGS. 2*a* and 2*b*, an example of the display device as shown in FIG. 1 is illustrated. FIG. 2*a* is a front view showing an exemplary basic structure of the display device shown in FIG. 1, and FIG. 2*b* is a side view showing the exemplary basic structure of the display device shown in FIG. 1. The display device 200 as shown in FIGS. 2*a* and 2*b* comprises headband means 210, a first sub-connection unit 220, a first sub-display unit 230, a second sub-connection unit 240, a second sub-display unit 250 and an image capturing unit 260. In addition, the display device 200 as shown in FIGS. 2*a* and 2*b* further comprises a popup unit 270.

Furthermore, similar to the display device 100 shown in FIG. 1, the display unit 200 further comprises a processing unit for obtaining a first image to be displayed, and an image transmission unit (not shown) that transmits the first image to the first sub-display unit 230 and the second sub-display unit 250. According to one example of the present invention, the processing unit can be disposed in the headband means 210. Besides, the image transmission unit may be provided in the first sub-connection unit and the second sub-connection unit.

The headband means 210 is an example of the fixing unit as shown in FIG. 1. Specifically, when the headband means 210 is worn on the head, it can deform flexibly so that when the first sub-connection unit 220 and the second sub-connection unit 240 are in the second state, the first sub-connection unit 220 and the first sub-display unit 230 press against the left ear, and the second sub-connection unit 240 and the second sub-connection unit 250 press against the right ear.

In the example shown in FIG. 2, the connection unit may include the first sub-connection unit 220 and the second sub-connection unit 240, and the display unit may include the first sub-display unit 230 and the second sub-display unit 250. The first sub-connection unit 220 connects a first end of the headband means 210 and the first sub-display unit 230, and the second sub-connection 240 connects a second end of the headband means 210 and the second sub-display unit 250. As shown in FIG. 2, the first sub-connection unit 220 and the second sub-connection 240 are disposed symmetrically with respect to the headband means 210, and similarly, the first sub-display unit 230 and the second sub-display unit 250 are disposed symmetrically with respect to the headband means 210. The first portion of the display unit may include a first sub-portion located in the first sub-display unit 230 and a second sub-portion located in the second sub-display unit 250. The first sub-connection unit 220 and the second sub-connection 240 at least have a first state. When the display device 200 is worn on the user's head through the headband means 210, and when the first sub-connection unit 220 and the second sub-connection 240 are in the first state, the first sub-portion located in the first sub-display unit 230 and the second sub-portion located in the second sub-display unit 250 are located in the user's visual region and face the user.

According to one example of the present invention, the first sub-connection unit 220 may be a first support arm of the first sub-display unit 230 in the first state, and the second sub-connection unit 240 may be a second support arm of the second sub-display unit 250 in the first state.

The popup unit 270 connects the image capturing unit 260 and the headband means 210. The popup unit 270 has a pop-up state and a pack-up state. As shown in FIGS. 2*a* and 2*b*, when the popup unit is in the pop-up state, the image capturing unit 260 is located outside the headband means 210, and the image capturing unit 260 is on and acquiring images. And when the popup unit 270 is in the pack-up state, the image capturing unit 260 is located inside the headband means 210, and the image capturing unit 260 is off. The image capturing unit 260 may include one or more image capturing means.

In the display device according to the embodiments of the present invention, when there is no need for image capture, the image capturing unit may be accommodated in the headband means, thereby improving portability of the display device.

Figure 3A:
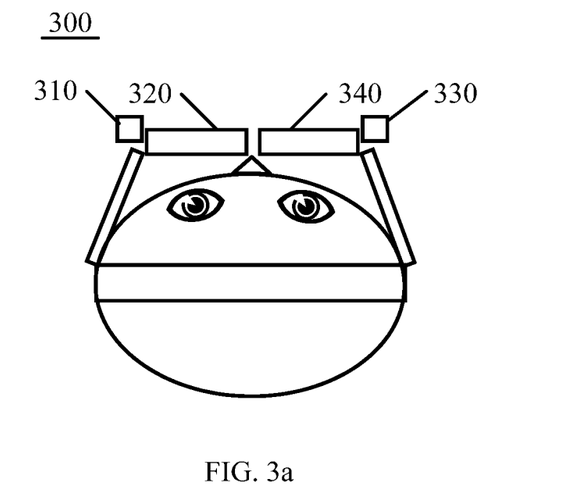
FIG. 3a is a top view showing an example of a user wearing the display device according to one embodiment of the present invention.
Figure 3B:
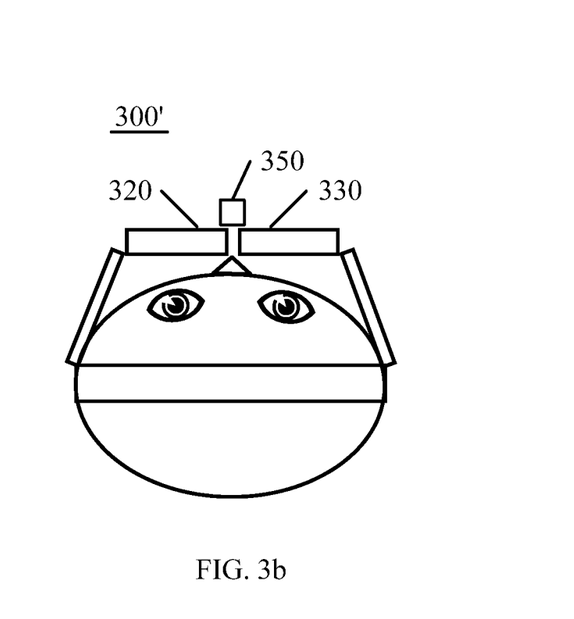
FIG. 3b is a top view showing an example of the user wearing the display device according to another embodiment of the present invention.

Although in the example shown in FIG. 2, descriptions are given by taking an example of the image capturing unit 260 being disposed on the headband means 210, but the present invention is not limited thereto. According to another example of the present invention, on condition that the connection unit may include a first sub-connection unit and a second sub-connection unit and the display unit may include a first sub-display unit and a second sub-display unit, the image capturing unit may include a first sub-image capturing unit and a second sub-image capturing unit that are disposed separately. FIG. 3a is a top view showing an example of a user wearing the display device according to one embodiment of the present invention. As shown in FIG. 3a, in the display device 300, a first sub-image capturing unit 310 is disposed corresponding to a first sub-portion 320 of the first sub-display unit, and the second sub-image capturing unit 330 is disposed corresponding to a second sub-portion 340 of the second sub-display unit. In addition, FIG. 3b is a top view showing an example of the user wearing the display device 300' according to another embodiment of the present invention. As shown in FIG. 3b, according to another example of the present invention, an image capturing unit 350 may be disposed between the first sub-portion 320 in the first sub-display unit and the second sub-portion 330 in the second sub-display unit.

Figure 4:
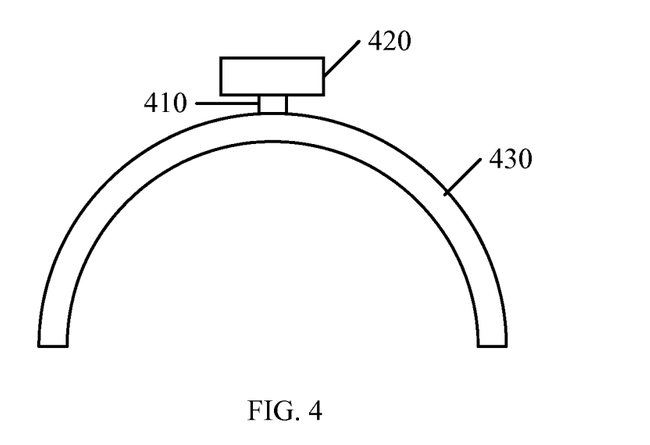
FIG. 4 is a schematic diagram showing an example of an image capturing unit of the device display shown in FIG. 1.

As described above, the display device may further include an adjusting unit for adjusting a capture area of the image capturing unit according to a position of an object to be acquired by the image capturing unit. In this case, according to one example of the present invention, the image capturing unit may include rotating means and capturing means. FIG. 4 is a schematic diagram showing an example of an image capturing unit of the device display shown in FIG. 1. As shown in FIG. 4, the image capturing unit includes rotating means 410 and capturing means 420. The rotating means 410 can rotate around an axis thereof, and the capturing means 420 is connected to the rotating means such that the capturing means can rotate with respect to the axis of the rotating means. As shown in FIG. 4, the rotating means 410 may be a holder mounted on the fixing unit 430, and the capturing means can be fixed to the holder. In addition, the rotating means 410 may also be disposed on the connection unit and/or display unit. The adjustment unit can adjust the rotating means based on the position of the object to be acquired, in order that the adjusting unit controls the acquisition unit to conduct panning based on the position of the object to be acquired, or adjusts a pitch angle for capture of the capturing means.

Figure 5:
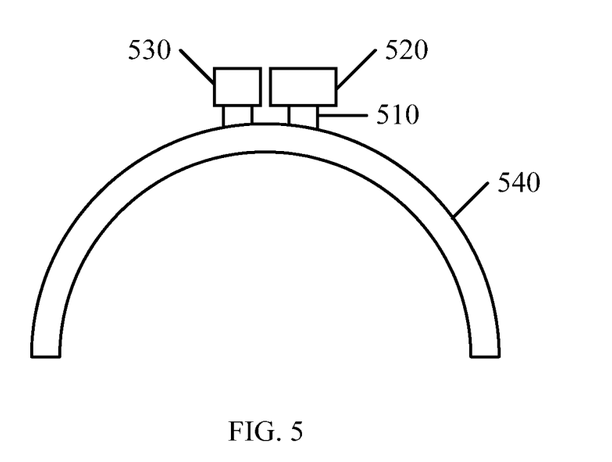
FIG. 5 is a schematic diagram showing another example of the image capturing unit of the device display shown in FIG. 1.

Further, on condition that the display device may further include an adjusting unit to adjust the capture area of the image capturing unit based on the position of the object to be captured by the image capturing unit, according to another example of the present invention, the image capturing unit may further include rotating means, reflecting means and capturing means. FIG. 5 is a schematic diagram showing another example of the image capturing unit of the device display shown in FIG. 1. As shown in FIG. 5, the image capturing unit includes rotating means 510, reflecting means 520 and capturing means 530. The rotating means 510 may be provided on the fixing unit 540, the rotating means 510 can rotate around the axis of itself, and the reflecting means 520 is connected to the rotating means 510 such that the reflecting means 520 can rotate with respect to the axis of the rotating means 510. The reflecting means 520 can reflect the surroundings of the display device to the capturing means. And the capturing means 530 can receive the light reflected from the reflecting means, to acquire the second image. The adjusting unit can adjust the rotating means according to the position of the object to be acquired, such that the adjusting unit controls the light reflected to the capturing means 530 by the reflecting means 520 based on the position of the object to be acquired.

In the display device according to the embodiments of the present invention, when it is capturing images, the capture area of the image capturing unit can be adjusted according to the position of the object to be acquired by the image capturing unit, so as to track and shoot the object to be acquired.

One person ordinarily skilled in the art can realize that units of respective examples described in the embodiments of the present invention can be implemented by electronic hardware, computer software or a combination thereof. In order to clearly illustrate interchangeability between hardware and software, in the above specification, compositions of each of the examples have been generally described in terms of functions. Whether these functions are performed in the form of hardware or software depends on constraints to particular applications and design of the technical solution. One person skilled in the art can use different methods for the respective particular applications to achieve the described functions, but such implementation shall not be regarded as going beyond the scope of the present invention.

One person skilled in the art can appreciate that various modifications, combinations, partial combinations and replacements can be made to the present invention according to design requirements and other factors, as long as they are within the scope of the appended claims and equivalents thereof.

The invention claimed is:

1. A display device, comprising:
   a fixing unit, through which the display device is capable of being worn on a head of a user;
   a processing unit configured to obtain a first image to be displayed;
   an image transmission unit configured to transmit the first image to a display unit;
   the display unit configured to display the first image obtained by the processing unit;
   a connection unit configured to connect the fixing unit and at least a first portion of the display unit, wherein the connection unit at least has a first state and a second state, such that in the first state at least the first portion is located in a user's visual region and faces the user and at least the first portion of the display unit is movable away from the user's visual region;
   an image capturing unit configured to capture a second image and comprising a rotator configured to rotate around an axis of itself;
   a reflector configured to reflect surroundings of the display device to an image collector, wherein
   the reflector is connected to the rotator such that the reflector is capable of rotating with respect to the axis of the rotator;
   the image collector is fixed on the fixing unit and configured to receive light reflected from the reflector and to capture the second image; and an adjusting unit configured to adjust the rotator to adjust a capture area of the image capturing unit according to a position of an object to be captured by the image capturing unit; and the processing unit being further configured to generate the first image based on the second image; and a pop-up unit configured to connect the fixing unit and the image capturing unit, having a pop-up state and a pack-up state, wherein, in the pop-up state, the image capturing unit is located outside the fixing unit, and the image capturing unit is on and capturing images; and in the pack-up state, the image capturing unit is located inside the fixing unit, and the image capturing unit is off.

2. The display device according to claim 1, wherein the image capturing unit is disposed outside the fixing unit.

3. The display device according to claim 1, wherein the connection unit includes a first sub-connection unit and a second sub-connection unit;

the display unit includes a first sub-display unit and a second sub-display unit, wherein the first sub-connection unit connects a first end of the fixing unit and the first sub-display unit, and the second sub-connection unit connects a second end of the fixing unit and the second sub-display unit;

the first portion includes a first sub-portion located in the first sub-display unit and a second sub-portion located in the second sub-display unit.

4. The display device according to claim 3, wherein the image capturing unit includes a first sub-image capturing unit and a second sub-image capturing unit;

the first sub-image capturing unit is disposed corresponding to the first sub-portion, and the second sub-image capturing unit is disposed corresponding to the second sub-portion.

5. The display device according to claim 3, wherein the image capturing unit is located between the first sub-portion and the second sub-portion.

6. The display device according to claim 1, further comprising:

a capture object positioning unit configured to determine the position of the object to be captured, the adjusting unit automatically adjusts the capture area of the image capturing unit according to the position of the object to be captured that is determined by the capture object positioning unit.

* * * * *